(12) United States Patent
Brown

(10) Patent No.: US 7,415,545 B1
(45) Date of Patent: Aug. 19, 2008

(54) METHOD AND APPARATUS FOR DYNAMIC LINK DRIVER CONFIGURATION

(75) Inventor: Steven W. Brown, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/142,030

(22) Filed: May 31, 2005

Related U.S. Application Data

(63) Continuation of application No. 09/431,703, filed on Nov. 1, 1999, now Pat. No. 6,959,343.

(51) Int. Cl.
*G06F 13/10* (2006.01)

(52) U.S. Cl. .............................. 710/8; 713/1; 713/100; 719/321; 719/327

(58) Field of Classification Search ................ None
See application file for complete search history.

(56) References Cited

U.S. PATENT DOCUMENTS

| | | | |
|---|---|---|---|
| 4,156,798 A | 5/1979 | Doelz | |
| 4,194,113 A | 3/1980 | Fulks et al. | |
| 5,014,262 A | 5/1991 | Harshavardhar | |
| 5,274,631 A | 12/1993 | Bhardwaj | |
| 5,343,461 A | 8/1994 | Barton et al. | |
| 5,394,556 A | 2/1995 | Oprescu | |
| 5,452,330 A | 9/1995 | Goldstein | |
| 5,490,253 A | 2/1996 | Laha et al. | |
| 5,495,481 A | 2/1996 | Duckwall | |
| 5,539,390 A | 7/1996 | Nagano et al. | |
| 5,541,670 A | 7/1996 | Hanai | |
| 5,568,641 A | 10/1996 | Nelson | |
| 5,583,922 A | 12/1996 | Davis et al. | |
| 5,621,659 A | 4/1997 | Matsumoto et al. | |
| 5,630,173 A | 5/1997 | Oprescu | |
| 5,640,595 A * | 6/1997 | Baugher et al. ............... | 710/10 |
| 5,684,715 A | 11/1997 | Palmer | |
| 5,701,476 A | 12/1997 | Fenger | |
| 5,701,492 A | 12/1997 | Wadsworth et al. | |
| 5,712,834 A | 1/1998 | Nagano et al. | |
| 5,719,862 A | 2/1998 | Lee et al. | |
| 5,784,648 A | 7/1998 | Duckwall | |
| 5,802,048 A | 9/1998 | Duckwall | |
| 5,802,057 A | 9/1998 | Duckwall et al. | |
| 5,805,073 A | 9/1998 | Nagano et al. | |

(Continued)

FOREIGN PATENT DOCUMENTS

EP   0 930 747 A1   7/1999

OTHER PUBLICATIONS

"IEEE Standard for a High Performance Serial Bus", IEEE Standard 1394-1995, Institute of Electrical and Electronics Engineers, Inc., Aug. 30, 1996.

(Continued)

*Primary Examiner*—Ilwoo Park
(74) *Attorney, Agent, or Firm*—Gazdzinski & Associates

(57) ABSTRACT

A method and apparatus embodied in transaction layer software suitable for use with serial bus devices, such as IEEE standard 1394 serial bus devices for supporting multiple link device drivers. The invention acquires or otherwise ascertains the capabilities of link devices and provides link device driver configurations to such link devices based on the link device's capabilities and behaviors, among other factors.

28 Claims, 5 Drawing Sheets

U.S. PATENT DOCUMENTS

| | | | | |
|---|---|---|---|---|
| 5,809,331 | A * | 9/1998 | Staats et al. | 710/10 |
| 5,832,298 | A | 11/1998 | Sanchez et al. | |
| 5,835,761 | A | 11/1998 | Ishii et al. | |
| 5,867,730 | A | 2/1999 | Leyda | |
| 5,875,301 | A | 2/1999 | Duckwall et al. | |
| 5,938,764 | A | 8/1999 | Klein | |
| 5,968,152 | A | 10/1999 | Staats | |
| 5,970,052 | A | 10/1999 | Lo et al. | |
| 5,987,605 | A | 11/1999 | Hill et al. | |
| 6,032,202 | A | 2/2000 | Lea et al. | |
| 6,038,625 | A | 3/2000 | Ogino et al. | |
| 6,041,286 | A | 3/2000 | White | |
| 6,070,187 | A | 5/2000 | Subramaniam et al. | |
| 6,073,206 | A | 6/2000 | Piwonka et al. | |
| 6,122,248 | A | 9/2000 | Murakoshi et al. | |
| 6,131,129 | A | 10/2000 | Ludtke | |
| 6,133,938 | A | 10/2000 | James | |
| 6,138,196 | A | 10/2000 | Takayama et al. | |
| 6,141,702 | A | 10/2000 | Ludtke et al. | |
| 6,141,767 | A | 10/2000 | Hu et al. | |
| 6,157,972 | A | 12/2000 | Newman et al. | |
| 6,160,769 | A | 12/2000 | Zou | |
| 6,167,532 | A | 12/2000 | Wiseccup | |
| 6,173,327 | B1 | 1/2001 | De Borst et al. | |
| 6,192,189 | B1 | 2/2001 | Fujinami et al. | |
| 6,202,210 | B1 | 3/2001 | Ludtke | |
| 6,212,633 | B1 | 4/2001 | Levy et al. | |
| 6,233,615 | B1 | 5/2001 | Van Loo | |
| 6,233,624 | B1 | 5/2001 | Hyder et al. | |
| 6,247,083 | B1 * | 6/2001 | Hake et al. | 710/107 |
| 6,253,114 | B1 | 6/2001 | Takihara | |
| 6,253,255 | B1 | 6/2001 | Hyder et al. | |
| 6,260,063 | B1 | 7/2001 | Ludtke et al. | |
| 6,266,334 | B1 | 7/2001 | Duckwall | |
| 6,266,701 | B1 | 7/2001 | Sridhar et al. | |
| 6,282,597 | B1 | 8/2001 | Kawamura | |
| 6,295,479 | B1 | 9/2001 | Shima et al. | |
| 6,308,222 | B1 | 10/2001 | Krueger et al. | |
| 6,311,228 | B1 | 10/2001 | Ray | |
| 6,345,315 | B1 | 2/2002 | Mishra | |
| 6,353,868 | B1 | 3/2002 | Takayama et al. | |
| 6,385,679 | B1 | 5/2002 | Duckwall et al. | |
| 6,425,019 | B1 | 7/2002 | Tateyama et al. | |
| 6,446,142 | B1 * | 9/2002 | Shima et al. | 710/16 |

OTHER PUBLICATIONS

"AV/C Digital Interface Command Set General Specificaion, Rev. 3.0", 1394 Trade Association, pp. 4-5, 20-34, Apr. 15, 1998.

"Enhancements to the AV/C General Specification 3.0 Version 1.0FC1", 1394 Trade Association, pp. 4, 6-17, Nov. 5, 1998.

"Fibre Channel-Methodologies for Jitter Specification", NCITS TR-25-1999, Jitter Working Group Technical Report, Rev. 10, pp. 1-96, Jun. 9, 1999.

P1394 Standard for a High Performance Serial Bus, Jul. 7, 1995, The Institute of Electrical and Electronic Engineers, Inc., Draft 8.0v2, pp. 19, 38-43, 107-109, 143-180, 207-250.

* cited by examiner

METHOD AND APPARATUS FOR DYNAMIC LINK DRIVER CONFIGURATION

CROSS-REFERENCE TO RELATED APPLICATION

This application is a continuation of U.S. patent application Ser. No. 09/431,703, filed on Nov. 1, 1999 now U.S. Pat. No. 6,959,343, which is hereby incorporated by reference as if set forth herein.

BACKGROUND OF THE INVENTION

1. Field of the Invention

This invention pertains generally to link driver configuration for IEEE Standard 1394 nodes. More particularly, the invention is a method for dynamic link driver configuration of link driver architecture for IEEE Standard 1394 modules.

2. The Prior Art

The Institute of Electrical and Electronics Engineers, Inc. (IEEE) defines the IEEE Standard 1394-1995 serial bus architecture in the document "IEEE Standard for a High Performance Serial Bus" published Aug. 30, 1996 which is incorporated herein by reference. In IEEE 1394, the serial bus architecture is defined in terms of nodes. In general, a node is an addressable entity (i.e., a logical entity with a unique address), which can be independently reset and identified. More than one node may reside on a single module, and more than one unit may reside in a single node.

A module is a physical device, comprising one or more nodes that share a physical interface. The address space provided by a node can be directly mapped to one or more units. A unit is a logical entity, such as a disk controller, which corresponds to unique I/O (input/output) driver software. On a multifunction node, for example, a processor and I/O interfaces could be different units on the same node.

During initialization (startup) of a module, certain hardware devices of the module are checked and appropriate drivers are loaded as is known in the art. For example, FIG. 1 illustrates a typical module device 1 having first and second nodes 2a, 2b. Nodes 2a, 2b include respective link layer services (LINK) 3a, 3b and physical layer services (PHY) 4a, 4b. During the start up of module 1, link driver 5a is loaded to configure LINK 3a, and link driver 5b is loaded to configure LINK 3b. The link drivers 5a, 5b provide necessary configuration information which allows the LINKs 3a, 3b to carry out its link layer services. The prior art implementation provides a static link driver which is configured identically for each node 2a, 2b without regard for the type of communication that will be carried out by the node. Thus, link driver 5a is configured the same way as 5b, even though node 2a may carry out different communication than node 2b.

The prior art implementation of providing a static configuration for link drivers is not always optimal. For example, in IEEE 1394 communication, nodes may carryout asynchronous and isochronous communication. In asynchronous communication such as SBP (serial bus protocol), it would be advantageous to have a link device configured for data pumping to provide optimum performance for such asynchronous transfers. On the other hand, in isochronous communication such as AV/C (audio/video control), no advantage is provided if the link device is configured for data pumping, since AV/C commands do not have high bandwidth requirements. Rather, AV/C communication would benefit if the link device is configured for transferring isochronous data. Thus, the current implementation of providing a static configuration link driver for all LINKS (3a, 3b, for example) is a disadvantage.

As an example, LINK 3a may be able to receive and process 2054 byte packet sizes, while LINK 3b may be able to receive and process only 512 byte packet sizes. The prior art implementation would configure link device drivers 5a, 5b to handle 512 byte packet sizes, even though LINK 3a is able to handle larger (2054 byte) sizes. Thus, the capabilities of LINK 3a are not fully utilized where static link driver configurations are provided as is carried out in the prior art.

Accordingly, there is a need for a method which provides multiple link device driver configurations based on the capabilities of the link device and based on the specific behaviors of the link device. The present invention satisfies these needs, as well as others, and generally overcomes the deficiencies found in the background art.

An object of the invention is to provide a method for configuring link device drivers which overcomes the deficiencies of the prior art.

Another object of the invention is to provide a method for configuring link device drivers based on the capabilities of the link device.

Another object of the invention is to provide a method for configuring link device drivers based on the specific behaviors of the link device.

Another object of the invention is to provide a method for configuring link device drivers by ascertaining the capabilities of link devices before providing the configuration information for the link device drivers.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE INVENTION

The present invention is a method and apparatus embodied in transaction layer software suitable for use with serial bus devices, such as IEEE standard 1394 serial bus devices for supporting multiple link device drivers. In its most general terms, the invention acquires or otherwise ascertains the capabilities of link devices and provides link device driver configurations to such link devices based on the link device's capabilities and behaviors, among other factors.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention. The method and operation of the invention may be carried out by a conventional processor within the serial bus device as is known in the art.

In general the invention may be used to configure one or more link device drivers in a module of a serial bus device according to the capabilities of the link devices, the behavior of the link devices, and other criteria.

In a first system embodiment, the invention operating in the transaction layer of the module is operatively coupled for communication to one or more link devices for the configuration of the link device drivers for the link devices. In a second system embodiment, the invention operating in the transaction layer of the module is operatively coupled for communication to a device driver service which is operatively coupled for communication with one or more link devices. The device driver service provides messaging between the transaction layer and the link devices for the configuration of the link device drivers. In general, the invention and the link devices communicate via driver control commands.

The link devices which for which the invention provides link driver configuration may comprise the same or different types. In cases where the link devices are the same type, the invention configures the link driver for each link device according to the behavior of the link device (e.g., the type of communication carried out by the link device) as well as the capabilities of the link device. For example, in a module having first and second nodes, each node having a link device, first node may be configured for asynchronous communication, while the second node may be configured for isochronous communication. Even though the link device in the first node is identical to the link device in the second node, the invention may provide link driver configuration optimized for asynchronous data transfer to the link device in the first node and link driver configuration optimized for isochronous data transfer to the link device in the second node to thereby support the behavior carried out by each respective module.

Other criteria may be used to configure link devices including, for example, user defined input criteria provided by a user of the module.

In operation, during initialization, link drivers are "installed" or loaded according to the type of system involved. For embedded systems, the method for installing device drivers will vary depending on the needs of the implementation. Device drivers for locally resident drivers may be pre-compiled into a ROM image. Under this arrangement, at boot time the drivers would be called to perform initialization thereof.

The transaction layer software of the present invention then queries each of the link drivers to ascertain each link device's capabilities via a driver control command. In the preferred embodiment, the transaction layer requests the link's capabilities as soon as it becomes aware of the link device. In response, the link drivers transmit its respective capabilities to the transaction layer software. The capabilities of the link device may be staticly provided in a resident storage device, such as a BIOS (basic input/output system), for example. The transaction layer software may receive additional configuration data such as user-defined configuration, which may define specific behaviors of the module. The transaction layer software then generates link driver configuration data according to the link device capabilities and the other configuration data for each link device. The generated link driver configuration is then transmitted to the respective link device driver and loaded therein.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
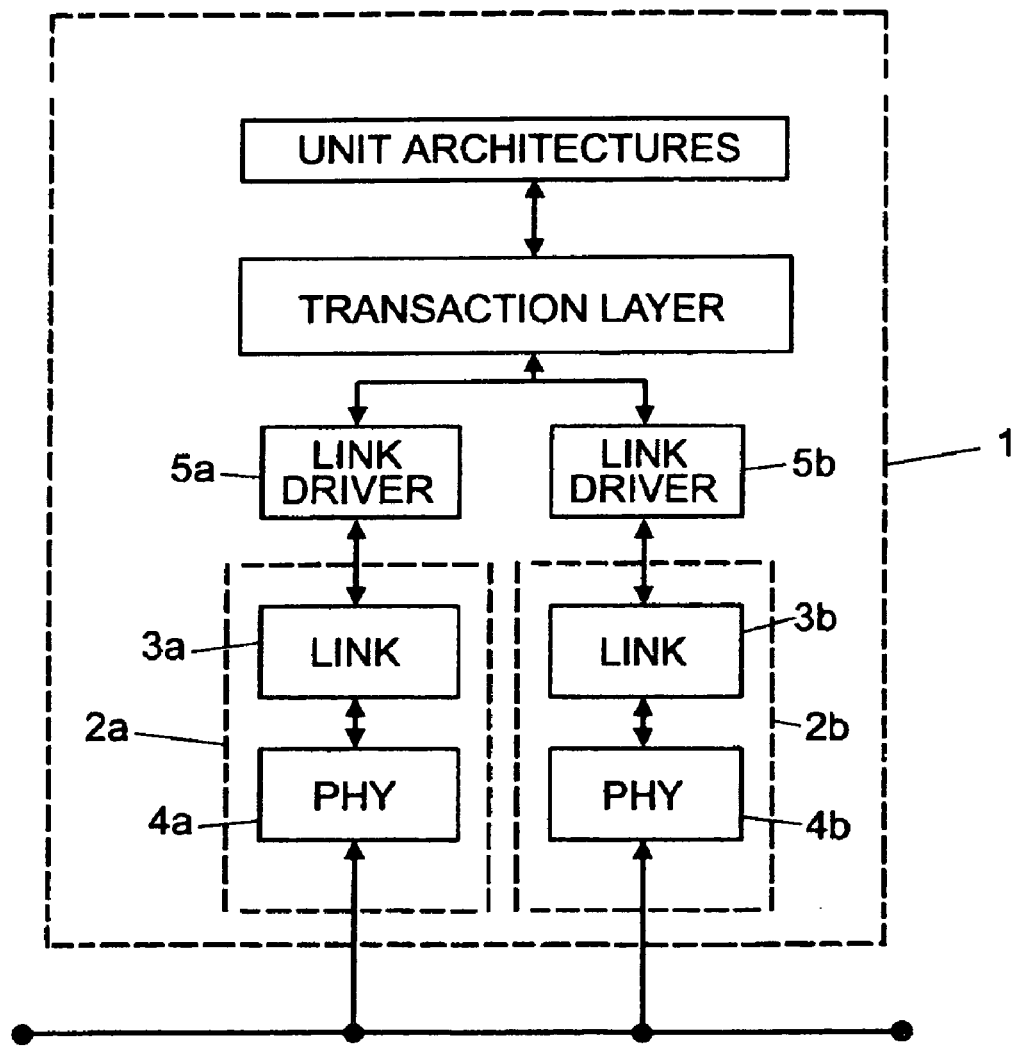
FIG. 1 is a functional block diagram of serial device module which carries out device driver configuration according to the prior art.
Figure 2:
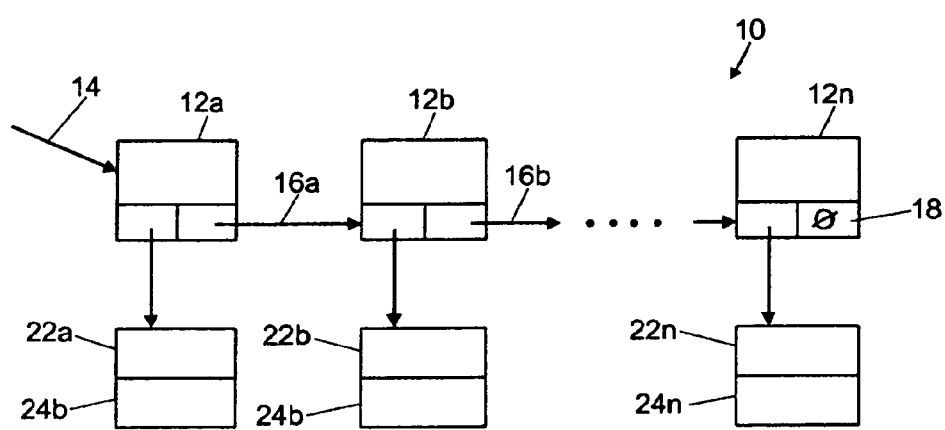
FIG. 2 is a functional block diagram of an illustrative link data structure suitable for use with the present invention.
Figure 3:
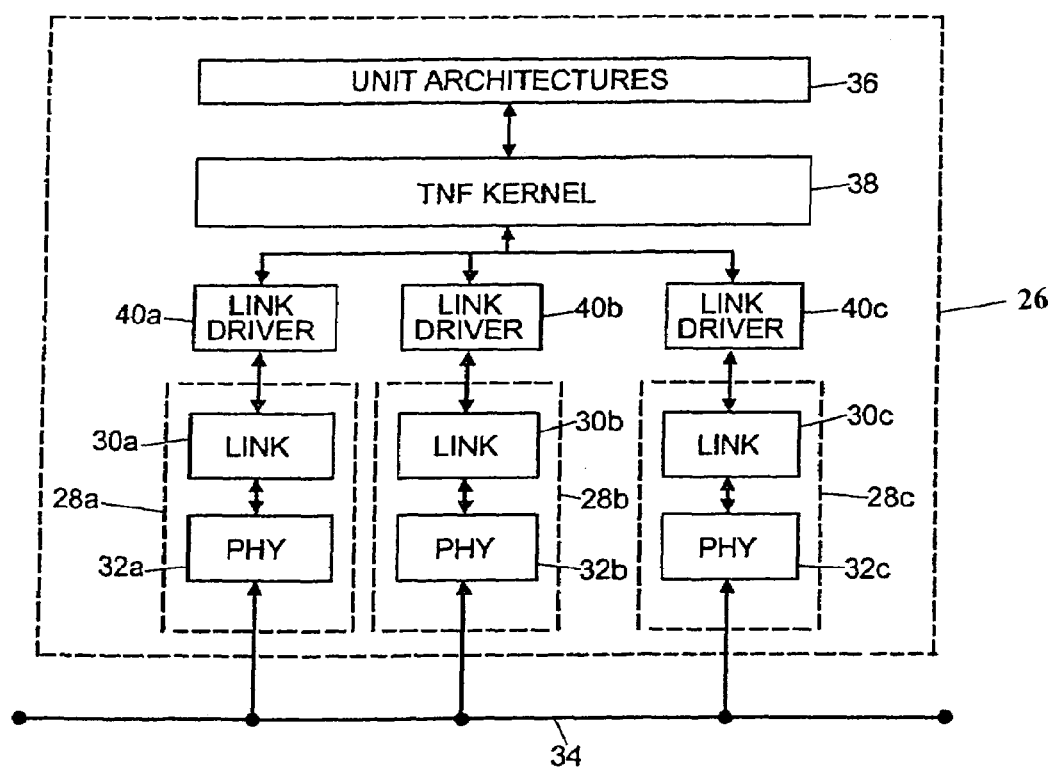
FIG. 3 is a functional block diagram of a first embodiment serial device module which carries out device driver configuration according to the present invention.
Figure 4:
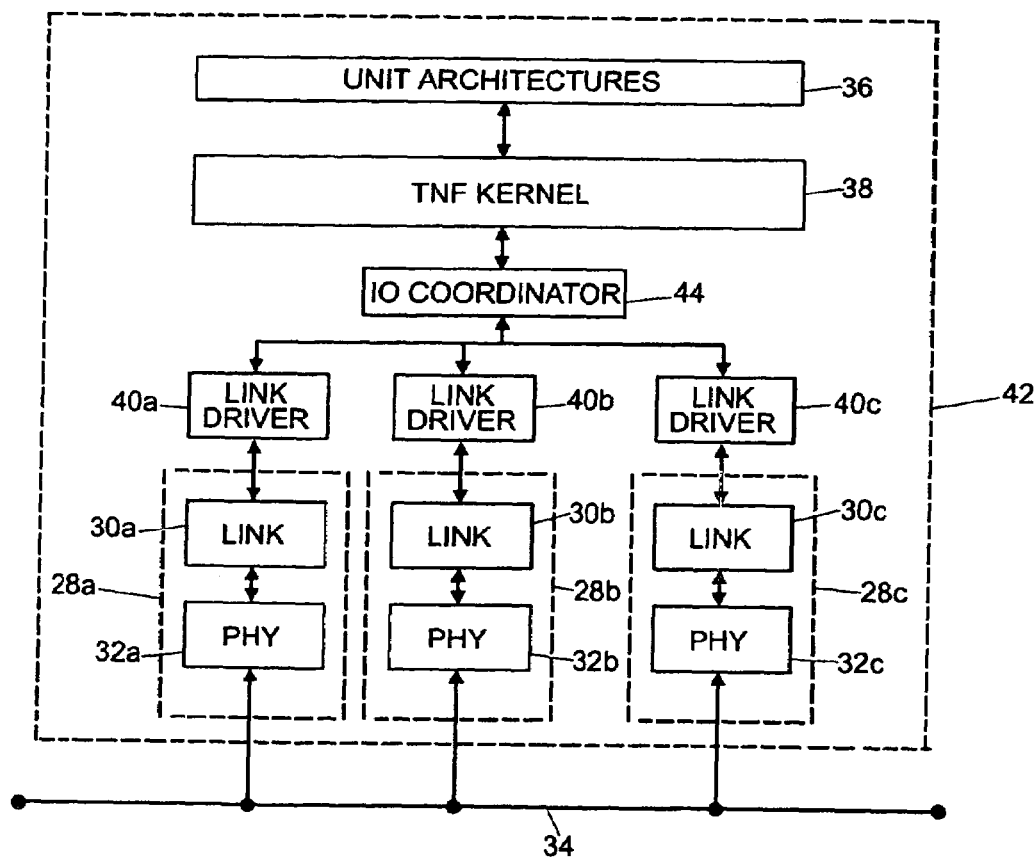
FIG. 4 is a functional block diagram of a second embodiment serial device module which carries out device driver configuration according to the present invention.
Figure 5:
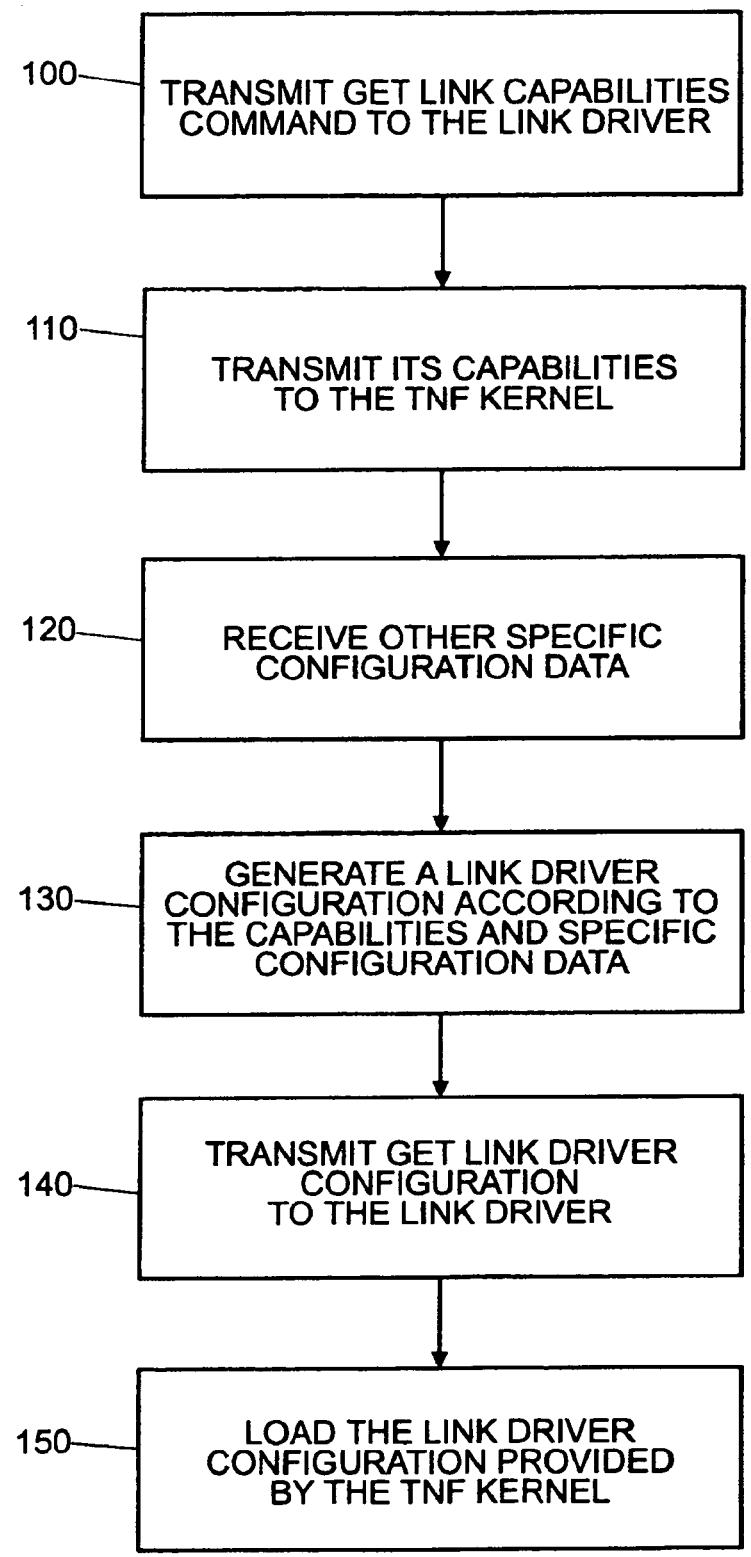
FIG. 5 is a flow chart showing generally acts for configuring link drivers according to the present invention.

Referring more specifically to the drawings, for illustrative purposes the present invention is embodied in the apparatus shown FIG. 2 through FIG. 4 and the method outlined in FIG. 5. It will be appreciated that the apparatus may vary as to configuration and as to details of the parts, and that the method may vary as to details and the order of the acts, without departing from the basic concepts as disclosed herein. The invention is disclosed generally in terms of a method and system which provides multiple link device driver configurations based on the capabilities of the link device and based on the specific behaviors of the link device, although numerous other uses for the invention will suggest themselves to persons of ordinary skill in the art.

Referring first to FIG. 2, there is depicted a block diagram of an illustrative link data structure 10 suitable for use with the present invention. It will be appreciated that the data structure depicted in FIG. 2 and described herein is only exemplary and that other data structures may be used in conjunction with the present invention, such as database tables and trees, for example.

Link data structure 10 is a link list of link device nodes 12a through 12n, and is maintained by the transaction software (TNF kernel) of the present invention. Each link device node 12a through 12n represents a link device in the module and includes information about the link device. For example, in a module having two link devices, the first link device would be represented by node 12a and the second link device would be represented by node 12b.

A main pointer 14 provides a link to the link data structure 10. Link devices nodes 12a through 12n further may include a peer pointer 16a through 16(n−1) to thereby allow TNF kernel to navigate the link data structure 10 for each link device of the module. Thus, node 12a includes a peer pointer 16a to node 12b, node 12b includes a peer pointer 16b to node 12c, etc. Since the last node 12n does not have additional peers to point to, node 12n does not include a peer pointer, shown as a null pointer 18.

Each node 12a through 12n further includes a corresponding link configuration data structure 22a through 22n and a corresponding link capabilities data structure 24a through 24n. The link configuration data structure 22a through 22n is used by the TNF kernel to instruct the link device how it should be configured. For example, the link configuration data structure 22a through 22n controls how the link behaves on the serial bus, among other things. The link capabilities data structure 24a through 24n provides the TNF kernel with information about the link device. For example, the link capabilities data structure 24a through 24n may provide such information about the corresponding link device as the link device's maximum sync packet capabilities, support or non-support for busy mode, cycle accuracy, capability for cycle master, CSR-ROM support, and other like capabilities.

Referring now to FIG. 3, there is shown a functional block diagram of a first exemplary embodiment serial device module 26 which carries out device driver configuration according to the present invention. Module 26 includes three nodes 28a through 28c, each having a respective link layer (LINK) device 30a through 30c connected to a respective physical layer (PHY) devices 32a through 32c. LINKS 30a through 30c provide the link services for the module 26 as is known in the art, and PHY devices 32a through 32c provide the physical layer services for the module 26 as is known in the art. Each PHY device 32a through 32n is connected to serial bus 34 through a conventional serial interface connection.

The module 26 further includes one or more unit architectures 36 to present to other devices on the serial bus. Unit architectures 36 may comprise conventional units, such as a disk controller or some other storage device and a scanner controller, for example.

The unit architectures 36 and the LINKS 30a through 30c are operatively coupled for communication to TNF kernel 38. The TNF kernel 38 provides transactional services for module 26 and the method of the invention as described herein and in further detail in conjunction with FIG. 5.

In operation, when module 26 is initialized, Link drivers 40a through 40c are loaded (initialized) for respective LINKS 30a through 30c. As noted above, drivers are loaded according to the type of module involved. For embedded systems, the method for installing device drivers will vary depending on the needs of the implementation. Device drivers for locally resident drivers may be pre-compiled into a ROM image. Under this arrangement, at boot time the drivers would be called to perform initialization thereof. Under either arrangement, or other suitable arrangements, a signal is transmitted to the TNF kernel to communicate the initialization of the link drivers. Link drivers 40a through 40c are then configured as described below. For each LINK 30a through 30c, the TNF kernel 38 creates link device nodes (12a through 12c) using the link data structure 10 as described above in conjunction with FIG. 2. As noted above, other data structures may be used without departing from the spirit and scope of the present invention.

The TNF kernel 38 then queries each link driver 40a through 40c for the link capabilities of the LINKS 30a through 30c. In the preferred embodiment, the TNF kernel 38 requests each link's capabilities as soon as it becomes aware of the link device. In response, link drivers 40a through 40 provides the capabilities of respective LINKS 30a through 30c by providing link capabilities data, which is stored into data structure 24a through 24c for respective nodes 12a through 12c. The TNF kernel 38 may also receive other link configuration data provided by a user. The TNF kernel 38 evaluates the link capabilities of LINKS 30a through 30c and the other link configuration data, if any, to generate appropriate link driver configurations according each LINK's capabilities and user-defined configuration. The link configuration generated by TNF kernel 38 is then stored to link configuration data structure 22a through 22c associated with respective nodes 12a through 12c in link data structure 10 and is communicated to link drivers 40 a through 40c for configuration therein.

Referring now to FIG. 4, there is shown a functional block diagram of a second exemplary embodiment serial device module 42 which carries out device driver configuration according to the present invention. Module 42, like module 26, includes three nodes 28a through 28c, each having a respective link layer (LINK) device 30a through 30c connected to a respective physical layer (PHY) devices 32a through 32c. LINKS 30a through 30c provide the link services for the module 42, and PHY devices 32a through 32c provide the physical layer services for the module 42. Each PHY device 32a through 32n is connected to serial bus 34 via conventional serial interface connection.

The module 42 also includes one or more unit architectures 36 to present to other devices on the serial bus. The unit architectures 36 are operatively coupled for communication to TNF kernel 38. The TNF kernel 38 provides transactional services for module 42 and the link driver configuration of LINKS 28a through 28c as described above and in conjunction below with FIG. 5.

The module 42 further includes device driver services (IO coordinator 44) operatively coupled to the TNF kernel 38 and the LINKS 30a through 30c. The IO coordinator 44 provides, among other things, event notification to TNF kernel 38 of LINKS 30a through 30c.

In operation, when module 42 is initialized, Link drivers 40a through 40c are loaded (initialized) for respective LINKS 30a through 30c. In response to the Link drivers 40a through 40c being loaded, the IO coordinator 44 communicates to the TNF kernel 38 that Link drivers 40a through 40c have been initialized for LINKS 30a through 30c.

For each LINK 30a through 30c, the TNF kernel 38 creates link device nodes (12a through 12c) using the link data structure 10 as described above in conjunction with FIG. 2. As noted above, other data structures may be used without departing from the scope of the present invention.

The TNF kernel 38 then queries each link driver 40a through 40c for the link capabilities of the LINKS 30a through 30c. In response, link drivers 40a through 40 provides the capabilities of respective LINKS 30a through 30c by providing link capabilities data, which is stored into data structure 24a through 24c for respective nodes 12a through 12c. The TNF kernel 38 may also receive other link configuration data provided by a user. The TNF kernel 38 evaluates the link capabilities of LINKS 30a through 30c and the other link configuration data, if any, to generate appropriate link driver configurations according each LINK's capabilities and user-defined configuration. The link configuration generated by TNF kernel 38 is then stored to link configuration data structure 22a through 22c associated with respective nodes 12a through 12c in link data structure 10 and is communicated to link drivers 40 a through 40c for configuration therein.

While the above illustrative embodiments (module 26 and module 42) were described using three nodes 28a through 28c, the method of the invention may also be carried out with a module having one or more nodes. As illustrated, the method of the invention may be carried out with or without device driver services (IO coordinator 44, or other like messaging services).

The method and operation of the invention will be more fully understood by reference to the flow chart of FIG. 5, as well as FIG. 2 through FIG. 4. FIG. 5 illustrates generally the actions associated with providing dynamic configuration ROM using double image buffers in accordance with the present invention. The order of operation as shown in FIG. 4 and described below are only exemplary, and should not be considered limiting.

At box 100, the TNF kernel 38 has become aware of one or more link drivers (and corresponding link devices) which need to be configured according each respective link device's capabilities, behaviors, as well as other user-defined configuration data. The TNF kernel 38 may recognize the link devices using various methods, such as via a device driver notification service, for example, as described above in conjunction with FIG. 4. For each link device, the TNF kernel 38 transmits a "get link capabilities" driver control command to each link driver initialized for the link devices. As noted above, the TNF kernel maintains the link device information in a data structure (for example, data structure 10). For each link device, the TNF kernel creates a data record for recording the capabilities of the link device. Box 110 is then carried out.

At box 110, the link driver receives the "get link capabilities" driver control command from the TNF kernel 38. As noted above, the capabilities of a link device may be statically provided in a resident storage device, such as a BIOS (basic input/output system, for example. The link driver ascertains these capabilities and transmits the capabilities to the TNF kernel 38. Box 120 is then carried out.

At box 120, the TNF kernel 38 receives the link device's capabilities transmitted by the link driver from box 110. The link device capabilities may include such information as maximum sync packet capabilities, support or non-support for busy mode, cycle accuracy, capability for cycle master, CSR-ROM support, and other like capabilities. The TNF kernel 38 may also receive additional configuration data such as user-defined configuration, which may define specific behaviors of the link device. Box 130 is then carried out.

At box 130, the TNF kernel 38 evaluates the link device's capabilities and behaviors and provides link driver configuration accordingly. Box 140 is then carried out.

At box 140, the TNF kernel 38 communicates the link driver configuration generated from box 130 to the link driver for configuration therein. As noted above, the TNF kernel uses the link data structure 10 and the associated link configuration data structure 22a through 22n to instruct the link driver how it should be configured. The data structure 22a through 22n is used to control how the link behaves on the IEEE Standard 1394 bus, among other things. Box 150 is then carried out.

At box 150, the link driver configures itself according the configuration provided by the TNF kernel 28 in the link driver data structures 22a through 22n.

Accordingly, it will be seen that this invention provides a method which provides multiple link device driver configurations based on the capabilities of the link device and based on the specific behaviors of the link device. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for configuring a link driver for a link device in a serial bus device, comprising:
    a) querying said link driver for its capabilities by way of a transaction layer process;
    b) receiving said capabilities of said link device; and
    c) determining whether said link device exhibits a first behavior, and generating a first link driver configuration if said link device exhibits said first behavior, said first link driver configuration based at least in part on said capabilities of said link device; otherwise
    d) generating a second link driver configuration, said second link driver configuration based at least in part on said capabilities and a second behavior of said link device.

2. The method of claim 1, wherein said first behavior comprises an asynchronous communication behavior.

3. The method of claim 1, wherein said second behavior comprises an isochronous communication behavior.

4. The method of claim 1, further comprising receiving user-defined configuration data for said link device before said generating said first or second link driver configuration, wherein said generating of said first or second link driver configuration further uses said user-defined configuration data.

5. The method of claim 1, wherein said serial bus device comprises an IEEE Standard 1394 device.

6. The method of claim 1, wherein said first and said second behaviors comprise the type of communication carried about by said serial bus device.

7. The method of claim 6, wherein said first link driver configuration is configured for an asynchronous communication type.

8. The method of claim 7, wherein said second link driver configuration is configured for an isochronous communication type.

9. The method of claim 1, wherein said received capabilities of said link device comprise at least one of:
    a maximum sync packet capability;
    a support capability for busy mode;
    a cycle accuracy capability;
    a cycle master capability; and
    a CSR-ROM support capability.

10. The method of claim 1, further comprising storing information relating to said capabilities in a storage device.

11. The method of claim 1, wherein said act of querying is performed substantially in response to the detection of said link device.

12. An apparatus that supports multiple link driver device configurations, comprising:
    a) a transaction layer software unit operating in a serial bus device; and
    b) at least one link layer service unit operatively coupled to said transaction layer software, said transaction layer software unit configured to ascertain capabilities and behaviors of said link layer service unit and to provide at least a first link driver configuration and/or a second link driver configuration for said link layer service unit;
    wherein said transaction layer software unit provides either said first link driver configuration or said second link driver configuration based at least on said capabilities and behaviors.

13. The apparatus of claim 12, wherein said behaviors comprise the type of communication carried about by said serial bus device.

14. The apparatus of claim 13, wherein said first link driver configuration is configured for an asynchronous communication type.

15. The apparatus of claim 13, wherein said second link driver configuration is configured for an isochronous communication type.

16. A method for configuring link drivers for a plurality of link devices in a serial bus device, comprising:
    a) querying each said link driver for its capabilities by way of a transaction layer process;
    b) receiving said capabilities of each said link device; and
    c) determining whether each said link device exhibits a first behavior or a second behavior; and
    d) generating a first link driver configuration if individual ones of said link devices exhibit said first behavior, said first link driver configuration based at least in part on said capabilities of said link device; otherwise
    e) generating a second link driver configuration, said second link driver configuration based at least in part on said capabilities and a second behavior of individual ones of said link devices.

17. The method of claim 16, further comprising receiving user-defined configuration data for each said link device before said generating said first link driver configuration or said second link driver configuration;

wherein said generating of said first and second link driver configurations further uses said user-defined configuration data.

18. The method of claim 16, wherein at least one of said plurality of link drivers is provided said first link driver configuration, said first link driver configuration being configured for asynchronous communication.

19. The method of claim 16, wherein at least one of said plurality of link drivers is provided said second link driver configuration, said second link driver configuration being configured for isochronous communication.

20. A program storage device readable by a machine, tangibly embodying a program of instructions executable by the machine to perform a method for configuring link drivers for at least one link device in a serial bus device, said method comprising:
   a) querying said link driver for its capabilities by way of a transaction layer process;
   b) receiving said capabilities of said link device; and
   c) determining whether said link device exhibits a first behavior, and generating a first link driver configuration if said link device exhibits said first behavior, said first link driver configuration based at least in part on said capabilities of said link device; otherwise
   d) generating a second link driver configuration, said second link driver configuration based at least in part on said capabilities and a second behavior of said link device.

21. The program storage device of claim 20, wherein said method further comprises receiving user-defined configuration data for said link device before said generating of said first link driver configuration or said second link driver configuration, wherein said generating said first and second link driver configuration further uses said user-defined configuration data.

22. The program storage device of claim 20, wherein said program storage device readable by a machine is selected from the group consisting of:
   a magnetic media;
   an optical media; and
   a semiconductor media.

23. A method for dynamically configuring a link device driver, comprising:

determining one or more capabilities and behaviors of a link device by sending one or more requests to a link device driver associated with said link device;
generating configuration information for said link device driver based at least in part on said one or more capabilities and behaviors; and
configuring said link device driver with a first link driver configuration if said link device exhibits a first behavior, said first link driver configuration based at least in part on said one or more capabilities of said link device; otherwise
configuring said link device driver with a second link driver configuration, said second link driver configuration based at least in part on said capabilities and a second behavior of said link device.

24. The method of claim 23, wherein said acts of determining and generating are performed substantially by a transaction layer process.

25. The method of claim 23, further comprising storing information relating to said one or more capabilities in a storage device.

26. The method of claim 25, wherein said storage device comprises a BIOS.

27. The method of claim 23, wherein said act of determining is performed substantially in response to the detection of said link device.

28. Apparatus for configuring a link driver for a link device in a serial bus device, comprising:
   means for querying said link driver for its capabilities by way of a transaction layer process;
   means for receiving said capabilities of said link device; and
   means for determining whether said link device exhibits a first behavior or a second behavior;
   means for generating a first link driver configuration if said link device exhibits said first behavior, said first link driver configuration based at least in part on said capabilities of said link device; and
   means for generating a second link driver configuration if said link device does not exhibit said first behavior, said second link driver configuration based at least in part on said capabilities and said second behavior of said link device.

* * * * *